US012158533B2

(12) United States Patent
Pau et al.

(10) Patent No.: US 12,158,533 B2
(45) Date of Patent: Dec. 3, 2024

(54) METHOD, DEVICE AND SYSTEM OF PREDICTION OF DIRECTION OF ARRIVAL OF A SIGNAL

(71) Applicants: STMICROELECTRONICS S.r.l., Agrate Brianza (IT); STMICROELECTRONICS INTERNATIONAL N.V., Geneva (CH)

(72) Inventors: Danilo Pietro Pau, Sesto San Giovanni (IT); Alessandro Cremonesi, Geneva (CH)

(73) Assignees: STMICROELECTRONICS S.r.l., Agrate Brianza (IT); STMICROELECTRONICS INTERNATIONAL N.V., Geneva (CH)

( * ) Notice: Subject to any disclaimer, the term of this patent is extended or adjusted under 35 U.S.C. 154(b) by 610 days.

(21) Appl. No.: 17/461,457

(22) Filed: Aug. 30, 2021

(65) Prior Publication Data
US 2023/0068500 A1    Mar. 2, 2023

(51) Int. Cl.
G01S 3/04       (2006.01)
G01S 3/42       (2006.01)
H01Q 3/02       (2006.01)
H01Q 21/00      (2006.01)

(52) U.S. Cl.
CPC ............... G01S 3/043 (2013.01); G01S 3/42 (2013.01); H01Q 3/02 (2013.01); H01Q 21/00 (2013.01)

(58) Field of Classification Search
CPC .. G01S 3/043; G01S 3/42; H01Q 3/02; H01Q 21/00

USPC .......................................... 701/472; 342/445
See application file for complete search history.

(56) References Cited

U.S. PATENT DOCUMENTS

| 8,321,166 B2* | 11/2012 | O'Hare | G01C 19/42 |
| | | | 701/472 |
| 9,823,330 B2* | 11/2017 | Hart | H04W 64/006 |
| 10,587,987 B2* | 3/2020 | Thoresen | H04L 67/535 |

FOREIGN PATENT DOCUMENTS

| CN | 110007265 A | 7/2019 |
| CN | 110972074 A | 4/2020 |
| EP | 1124140 A1 | 8/2001 |

OTHER PUBLICATIONS

Agatonovic et al., "Efficient Neural Network Approach for 2D DOA Estimation Based on Antenna Array Measurements," Progress in Electromagnetics Research, 137, pp. 741-758, 2013.
Hegger, R., "Gaussian elimination solver (1)," last modified Aug. 14, 1998, modified for style by Paul Bourke. (2 pages).

(Continued)

Primary Examiner — Bo Fan
(74) Attorney, Agent, or Firm — Seed IP Law Group LLP (57) ABSTRACT

A device includes a memory and processing circuitry coupled to the memory. The processing circuitry, in operation, generates an indication of a predicted difference in a direction of arrival (DoA) of a signal using a trained autoregressive model. A predicted indication of a DoA of the signal is generated based on a previous indication of the DoA of the signal and the indication of the predicted difference in the DoA of the signal. The processing circuitry actuates or controls an antenna array based on predicted indications of the DoA of the signal.

28 Claims, 7 Drawing Sheets

(56) References Cited

OTHER PUBLICATIONS

Hegger, R., "Gaussian elimination solver (2)," last modified Aug. 14, 1998, modified for style by Paul Bourke. (2 pages).
Ljung, "System Identification, Theory for the User," 2nd Edition, Prentice Hall PTR, 1999, 631 pages.
"Hyperbolic function," Wikipedia, last edited Mar. 14, 2022, URL= https://en.wikipedia.org/wiki/Hyperbolic_functions, download date Mar. 14, 2022. (12 pages).
"Softmax function," Wikipedia, last edited Jan. 16, 2022, URL= https://en.wikipedia.org/wiki/Softmax_function, download date Mar. 14, 2022. (9 pages).
"Sigmoid function," Wikipedia, last edited Dec. 24, 2021, URL= https://en.wikipedia.org/wiki/Sigmoid_function, download date Mar. 14, 2022. (5 pages).

\* cited by examiner

FIG. 7

METHOD, DEVICE AND SYSTEM OF PREDICTION OF DIRECTION OF ARRIVAL OF A SIGNAL

BACKGROUND

Technical Field

The disclosure generally relates to Direction of Arrival (DoA) estimation, for example, in wireless systems with multiple antennas, such as Bluetooth receiver-transmitter dual systems.

Description of the Related Art

Generally, the DoA denotes the direction from which a propagating wave (emitted by a source transmitter) usually arrives at a set of antennas forming an antenna array. To overcome high path and penetration losses (such as losses due to noisy transmission and multiple path propagation), antenna beamforming may be employed to facilitate establishing and maintaining a robust communication link.

Beamforming may be employed in various wireless communication systems. Such systems may include, for example, 5G cellular systems, Bluetooth (BT as already mentioned) antenna systems, reconfigurable antenna systems, radio frequency (RDF) radiation pattern adaptation systems, radar systems, electronic-warfare (EF) applications, etc., and various combinations thereof.

A beam formed signal may be adapted according to a time varying DoA to reduce disturbances in the signal received at the destination. Processing algorithms may be employed to estimate the direction of arrival and to resolve the desired and interfering signals.

BRIEF SUMMARY

In an embodiment, a device includes a memory and processing circuitry coupled to the memory. The processing circuitry, in operation, generates an indication of a predicted difference in a direction of arrival (DoA) of a signal using an on-line trained autoregressive model. On-line means by using previous in time difference of DoA values to compute the coefficients of the autoregressive model, next to be applied for the prediction task. A predicted indication of a DoA of the signal is generated based on a previous indication of the DoA of the signal and the indication of the predicted difference in the DoA of the signal. The processing circuitry actuates or controls an antenna array based on predicted indications of the DoA of the signal.

In an embodiment, a system comprises an antenna array and processing circuitry coupled to the antenna array. The antenna array, in operation, transmits and receives signals. The processing circuitry, in operation generates predicted differences in a direction of arrival (DoA) of a signal using a trained autoregressive model; generates predicted DoAs of the signal based on the predicted differences; and controls operation of the antenna array based on predicted DoAs.

In an embodiment, a method comprises generating predicted differences in a direction of arrival (DoA) of a signal using a trained autoregressive model. Predicted DoAs of the signal are generated based on the predicted differences. Operation of an antenna array is controlled based on the predicted DoAs.

In an embodiment, a non-transitory computer-readable medium has contents which configure a processing system to perform a method. The method comprises: generating predicted differences in a direction of arrival (DoA) of a signal using a trained autoregressive model; generating predicted DoAs of the signal based on the predicted differences; and controlling operation of an antenna array based on predicted DoAs.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless the context indicates otherwise. The sizes and relative positions of elements in the drawings are not necessarily drawn to scale. For example, the shapes of various elements are selected, enlarged, and positioned to improve drawing legibility. The shapes of the elements as drawn have been selected for ease of recognition in the drawings. Moreover, some elements known to those of skill in the art have not been illustrated in the drawings for ease of illustration. One or more embodiments are described hereinafter with reference to the accompanying drawings in which.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to interfaces, power supplies, physical component layout, discrete circuitry, etc. in a communication environment, have not been shown or described in order to avoid unnecessarily obscuring descriptions of the embodiments. Additionally, the various embodiments may be methods, systems, or devices.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
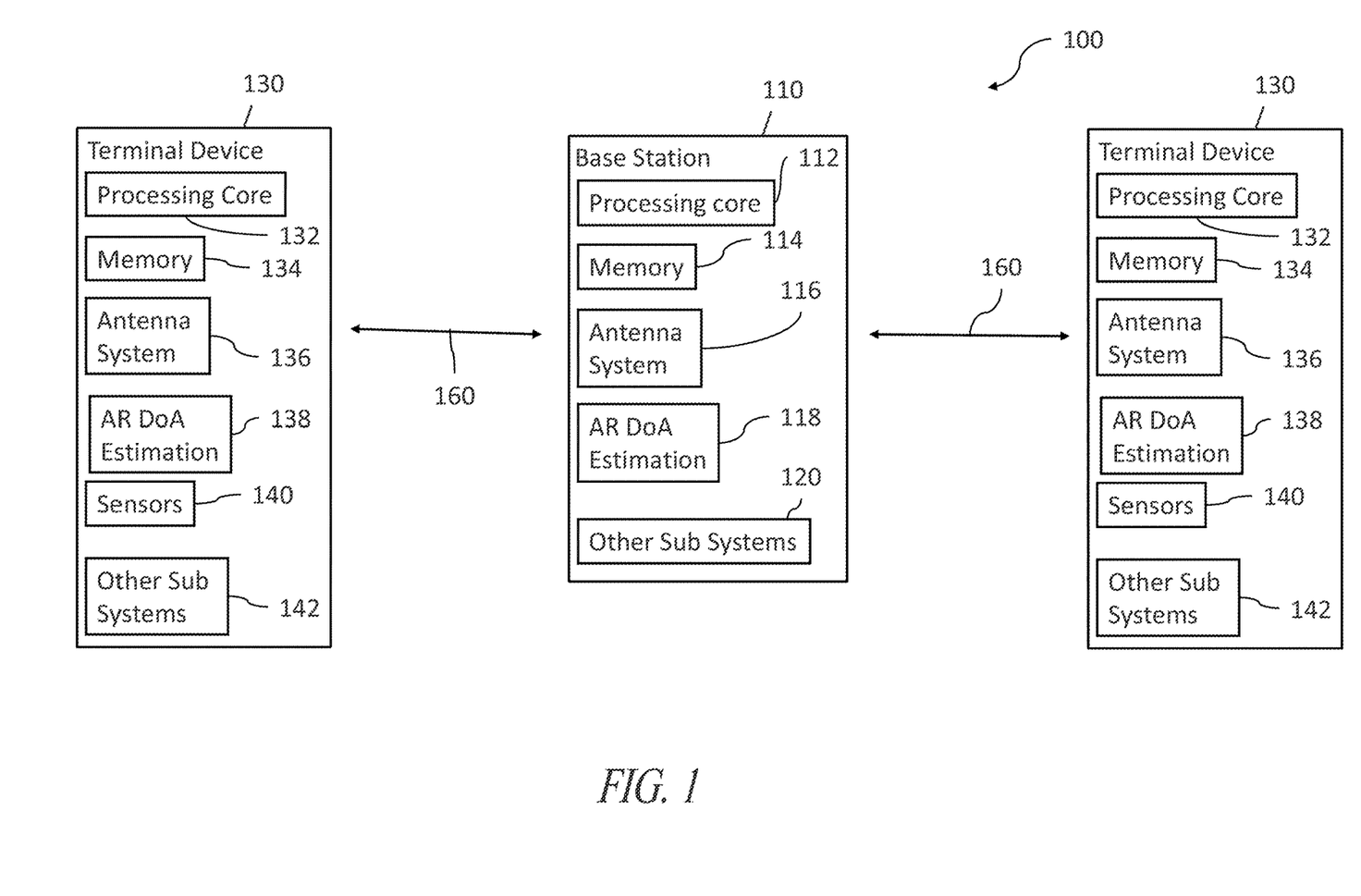
FIG. 1 is a diagram showing an exemplary embodiment of a communication system in which an embodiment of autoregressive (AR) based direction of arrival (DoA) estimation may be employed.

FIG. 1 is a functional block diagram of an embodiment of a communication system 100 of the type to which the embodiments, which will be described, may apply. The system 100 comprises a base station 110 and one or more terminal devices or terminals 130. The base station 110 may comprise, for example, a 5G base station, a router, an access point, a Bluetooth device, a terminal configured to operate as a base station or access point, etc. The terminals 130 may comprise, for example, a 5G terminal device, a Bluetooth device, etc.

The base station 110 as illustrated includes one or more processing cores or circuits 112, one or more memories 114, one or more antenna systems 116, and other subsystems 120. The processing cores 112 may comprise, for example, one or more processors, a state machine, a microprocessor, a programmable logic circuit, discrete circuitry, logic gates, registers, etc., and various combinations thereof. The processing cores 112 may control overall operation of the base station 110, execution of application programs by the base system 110, etc. The one or more memories 114 may include, for example, one or more volatile and/or non-volatile memories which may store, for example, all or part of instructions and data related to control and operation of the base station 110, applications and operations performed by the base station 110, etc. The antenna system 116 includes one or more antennas, which may include one or more arrays of antennas (see array 300 of FIG. 3). The one or more other sub systems 120 may include, for example, power supplies, bus systems to couple various components of the base station 110 together, interfaces to couple to the base station to other devices and networks, such as to a server via the internet, etc.

The terminal devices 130 as illustrated similarly include one or more processing cores or circuits 132, one or more memories 134, one or more antenna systems 136, and other subsystems 142, which may operate in a manner similar to that described above with respect to the corresponding components of the base station 110 to provide similar functions to the respective terminal devices 130. The terminal devices 130 also comprise one or more sensors 140, such as one or more inertial sensors, for example, one or more gyroscopes, one or more accelerometers, one or more barometers, etc., and various combinations thereof.

The base station 110 and the terminal devices 130 wirelessly communicate with each other via wireless communication links 160 established between the respective antenna systems 116, 136 of the base station 110 and the terminal devices 130. In operation, the base station 110 and one or more of the terminals 130 may move relative to each other. For example, one or more of the terminals may be a parcel post in an automated parcel sorting center.

Figure 2:
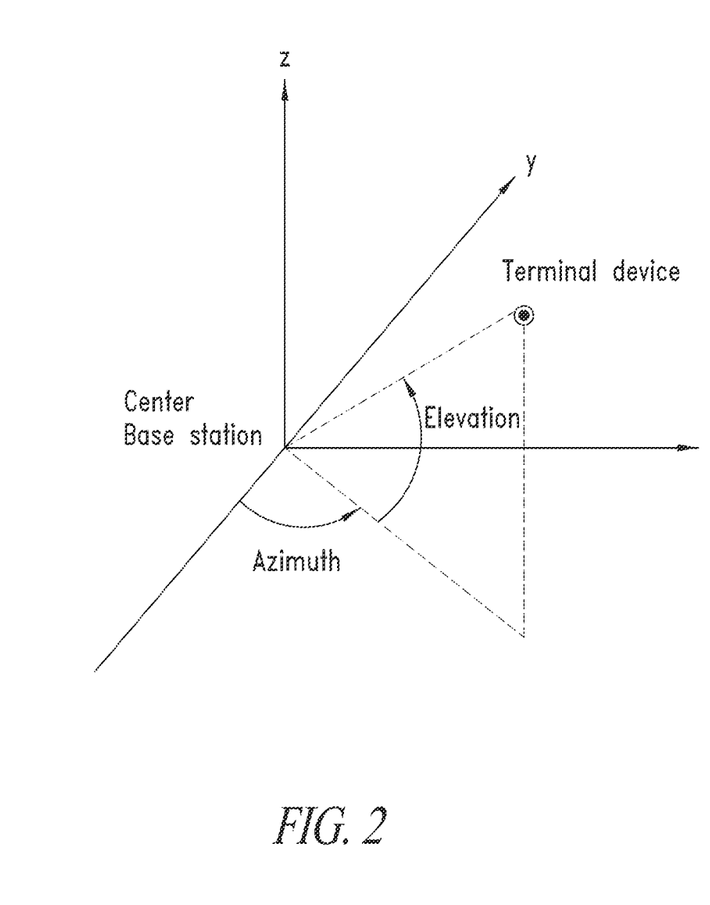
FIG. 2 is a conceptual diagram illustrating DoA in a Cartesian coordinate system.

Maintaining the wireless communication links 160 may include employing beamforming or other techniques to improve the quality of the communication links 130. As mentioned above, beamforming and other techniques may use estimates of the direction of arrival (DoA) to improve the signal quality. FIG. 2 is a conceptual diagram illustrating the DoA concept. As illustrated, the DoA may be expressed as an azimuth angle and an elevation angle. The azimuth angle of the DoA as illustrated is the angle between the y-axis and the orthogonal projection of the DoA vector onto the xy plane. The elevation angle as illustrated is the angle between the DoA vector and its orthogonal projection onto the xy-plane.

Conventional DoA estimation techniques include, for example, 2D MUSIC and artificial neural network (ANN) modeling techniques, both which are computationally costly and time consuming even if at different scale. For example, each 2D MUSIC estimate may take approximately 18 seconds, and each ANN estimate may take approximately 20 ms on a general purpose computer. This may be particular problematic when relative movement between the base station 110 and one of the terminals 130 is high, which may result in rapid changes over time of the DoA requiring frequent estimates of the DoA. These multiple measurements will come at the cost of multiple times the complexity of a single estimation, incurring extra energy, silicon area and power consumption. Such costs may be too high, for example, for a wireless device that is running on batteries.

To facilitate providing estimates of the direction of arrival in a less computationally and time expensive manner, the base station 110 and the terminals 130, as illustrated include an autoregressive (AR) DoA estimation circuit or module 118, 138. The AR DoA estimation circuits 118, 138 employ one or more embodiments of DoA estimation using autoregressive modeling techniques such as those discussed in more detail elsewhere herein.

Embodiments of the system 100 may include more components than illustrated in FIG. 1, may include fewer components than illustrated in FIG. 1, and may combine or split components illustrated in FIG. 1. For example, the AR DoA estimator 138 of a terminal 130 may be implemented by the processing core 132 executed a program stored in the memory 134, instead of as a separate circuit 138. In another example, the base station 110 may include a DoA estimator employing other DoA estimation or measurement techniques, such as 2D-Music or ANN conventional modeling techniques, instead of or in addition to an AR DoA estimator 118. In another example, the AR DoA estimator 138 may include a DoA compensation circuit, which, in operation, adjusts DoA measurements and estimates based on sensor data, such as data from the sensors 140. In another example, a separate DoA compensation circuit may be employed in some embodiments.

Figure 3:
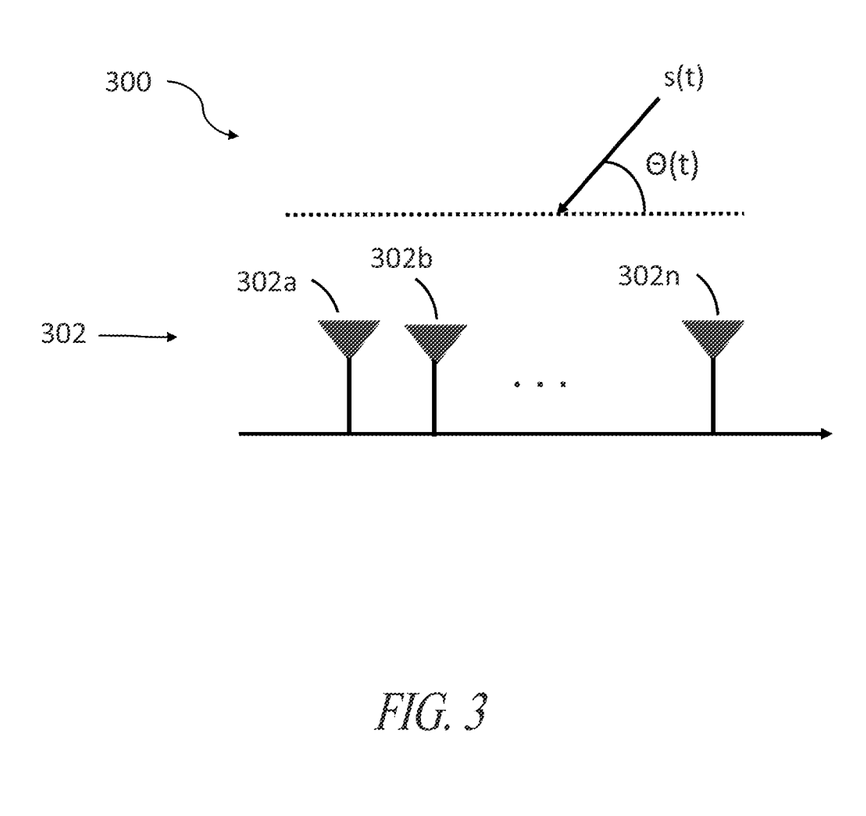
FIG. 3 illustrates an embodiment of an antenna system, which may be employed for example in the embodiment of FIG. 1.

FIG. 3 is a functional block diagram of an embodiment of an antenna system 300, which may be employed as the antenna systems 116, 138 of FIG. 1. The antenna system 300 as illustrated comprises a plurality of antennas 302a, 302b, ... 302n arranged as an array 302. A time-varying signal s(t) may have a DoA having a respective time varying DoA $\theta(t)$, with respect to the individual antennas 302a-302n of the array 302. In some embodiments, DoA may be measured as an angle with reference to orientation of the antenna array 302, using Azimuth and Elevation angles, as illustrated in FIG. 2. Some embodiments of antenna systems may have fewer or more antenna elements 302a-302n than illustrated in FIG. 3, such as one antenna or hundreds of antennas.

The inventors have realized DoA estimates may be predicted using autoregressive techniques based on past observations or measurements of the DoA. Such AR DoA techniques may be implemented using fast, computationally simple algorithms, such as a linear model, and may facilitate reducing the need to repeatedly perform estimates using computationally complex conventional algorithms as a terminal moves relative to a base station. In an embodiment, an AR DoA model is trained using a variable number of DoA estimates made over time, such as conventional 2D Music or ANN modeling. Subsequent DoA estimates are performed using the trained AR DoA model. Training an AR model using a set of samples may take approximately 7 ms on a 80 MHz 32 bits micro-controller such as STM32F4, and obtaining an individual estimate using a trained AR DoA model may take approximately 0.002 ms on the same micro-controller, which indicates a 3-order of magnitude between the training and prediction phase, and several order of magnitude more than any 2D MUSIC and ANN algorithm. In addition, the model memory may be of a very low size, for example, approximately as small as 20 bytes. Thus, it may be much less expensive computationally, memory and power consumption to train an AR DoA model and generate DoA predictions, than to predict all the samples using conventional DoA estimating techniques. In some embodiments, some of the samples may be predicted using conventional DoA estimating techniques (e.g., while generating data to train an AR model and training the model), while most of the samples may be generated using AR modeling after the model is trained.

In an embodiment, of AR DoA model, a DoA may be predicted based on past absolute and differential measurements (at times t−1, t−2 . . . t−T), which are then used to train and set a linear predictor which in turn will provide the prediction at time t. This method can be repeated multiple times to provide a series of DoA estimates. The process is a linear regression of the data in the current series against one or more past values in the same series. Considering the model as linear, then an Auto-Regressive (AR) model may be defined as:

$$\hat{x}_t = \theta_1 x_{t-1} + \theta_2 x_{t-2} + \ldots + \theta_\tau x_{t-\tau} \qquad 1$$

where $\Theta = [\theta_1, \ldots, \theta_\tau]$ is the vector of model parameters of length $\tau$ and is estimated by means of a Least Square minimization computed using a sequence of training data, $\tau$ is autoregressive order and a threshold parameter.

In an embodiment, quality control techniques may be employed to determine when a new set of training samples should be obtained, such as the use of thresholds. For example, a threshold number of estimates may be employed (e.g., after a threshold number of estimates have been made using AR DoA techniques, a new set of training samples is obtained), a threshold change in the DoA may be employed (e.g., if the change between AR DoA estimates exceeds a threshold value, an new set of training samples is obtained), threshold differences in other data indicative of the DoA may be employed (e.g., if the difference in an DoA estimate based sensor data from gyroscopes or accelerometers exceeds a threshold, a new set of training samples is obtained), or various combinations thereof.

Figure 4:
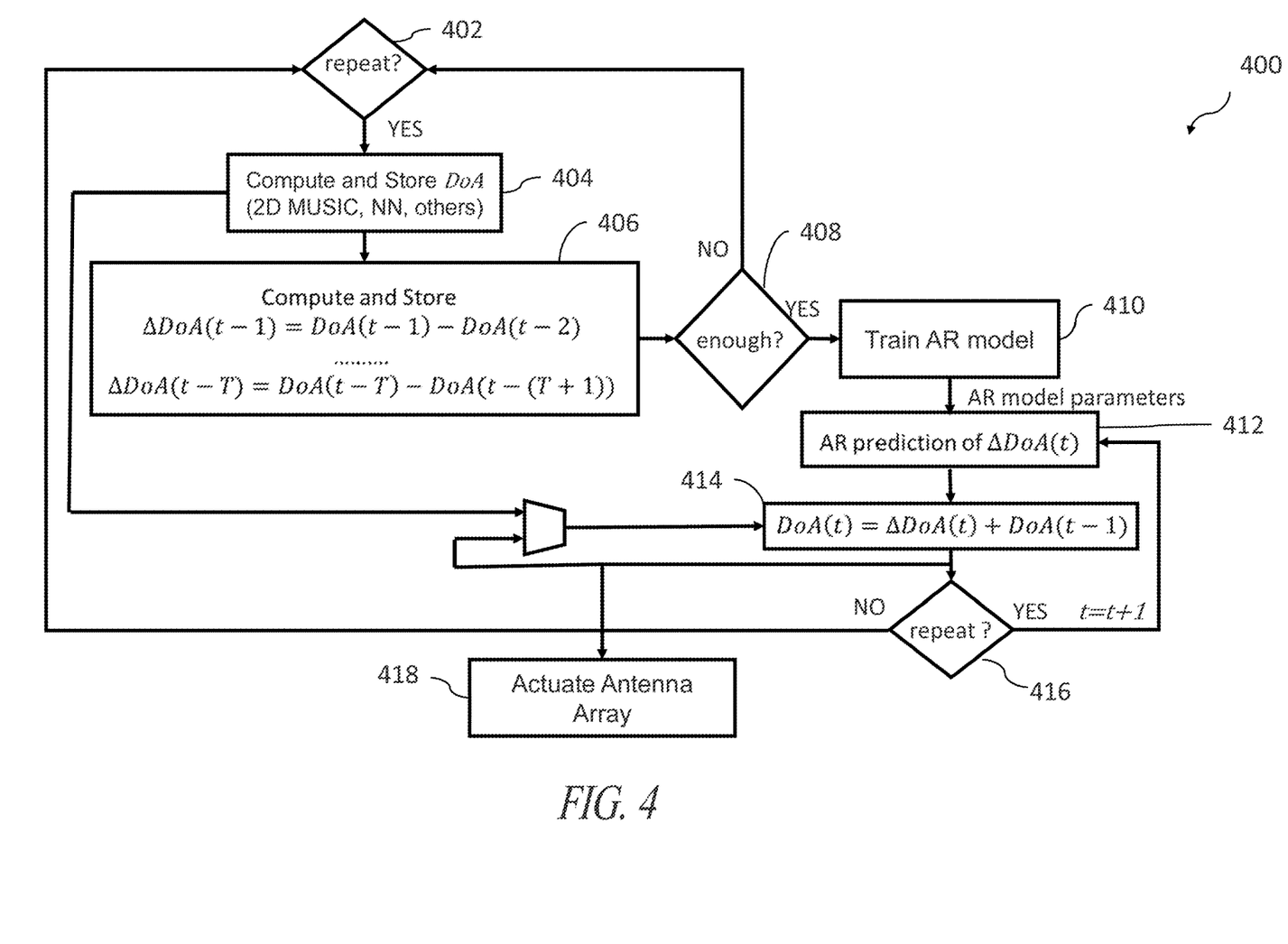
FIG. 4 illustrates an embodiment of a method of providing DoA estimates using AR model based DoA estimation.

FIG. 4 illustrates an embodiment of a method 400 of providing DoA estimates using a trained AR model and will be described for convenience with reference to FIGS. 1 to 3. The method may be performed, for example, under control of the AR DoA estimation circuitry 118 of the base station 110, or under control of the AR DoA estimation circuitry 138 of a terminal 130, or in a distributed manner under control of both the AR DoA estimation circuitry 118 of the base station 110 and the AR DoA estimation circuitry 138 of a terminal 130 of FIG. 1.

The method 400 begins at 402, where it is determined whether to initiate or repeat generation of a set of training data to train an AR-based DoA model. Initiating or repeating the generation of a set of training data may be done, for example, in response to a request to establish or update a communication link (e.g., between a base station 110 and a terminal device 130), in response to a determination at 408 that additional or replacement training data is needed, in response to a determination at 416 that a new set of training data is needed, etc. When it is determined at 402 to generate a set of training data, the method 400 proceeds from 402 to 404. When it is not determined at 402 to generate a set of training data, the method 400 waits at 402 for an indication a set of training data is needed.

At 404, the method 400 generates and stores a set of absolute DoA data values DoA(t−1), DoA(t−2) . . . , DoA(t−T) in a time interval 1, 2, . . . , T, where T is a number of samples of a training data set. This may be done, for example, using a 2D music algorithm or an ANN in a conventional manner. The method 400 proceeds from 404 to 406.

At 406, the method 400 differentiates the set of absolute DoA values, generating a set of differentiated DoA values ΔDoA(t−1), ΔDoA(t−2), . . . ΔDoA(t−T). The differentiated DoA values may be generated according to:

$$\Delta DoA(t-1) = DoA(t-1) - DoA(t-2)$$
$$\ldots$$
$$\Delta DoA(t-T) = DoA(t-T) - DoA(t-(T+1))$$

and stored, for example, in the memory 114, 134. The method 400 proceeds from 406 to 408.

At 408, the method 400 determines whether additional or replacement differentiated DoA values are needed. This may be done, for example, in response to an indication a larger training data set is needed or a data set over a larger time period (e.g., a determination that greater accuracy in the AR model is desired; an indication of more rapid relative movement from sensors 140; etc.), in response to an indication that a new training data set is needed (e.g., an indication that the differentiated DoA data set does not satisfy a reliability criteria), etc.

When it is determined at 408 to generate additional or replacement training data, the method 400 proceeds from 408 to 402. When it is not determined at 408 to generate additional or replacement training data, the method 400 proceeds from 408 to 410.

At 410, the method 400 trains an AR based DoA model using the set of differentiated DoA values, generating AR model parameters, for example, $\Theta = [\theta_1, \ldots, \theta_\tau]$ of Equation 1, estimated by means of a Least Square minimization computed using the differentiated DoA values as a sequence of training data. The method 400 proceeds from 410 to 412.

At 412, the method 400 predicts differentiated DoA values using the model trained at 410, generating predicted indications of differential DoA values ΔDoA(t). The method proceeds from 412 to 414. The predicted indications of differential DoA values may be predicted differential DoA values and for convenience may be referred to as predicted differential DoA values.

At 414, the method 400 generates estimated indications of DoA values based on the predicted differentiated DoA values generated at 412. This may be done according to:

$$DoA(t) = \Delta DoA(t) + DoA(t-1)$$

The input value DoA(t−1) may be provided in a first iteration from the values generated at 404, and in subsequent iterations using the value computed in a previous iteration. The method 400 proceeds from 414 to 416. The estimated indications of DoA values may be estimated DoA values and for convenience may be referred to as estimated DoA values.

At 416, the method 400 determines whether to continue to generate predicted DoA values using the trained model, or to obtain a new set of training data and retrain the model. This may be done, for example, in response to an indication a new training model should be generated, such as a threshold number of predictions having been made using the current model, an indication that the DoA estimates no longer satisfy a reliability criteria, sensors 140 provide measurement of acceleration or deceleration, etc.

When it is determined at 416 to continue to generate predicted DoA values using the trained model, the method 400 proceeds from 416 to 412, where a next DoA value in time is predicted. When it is not determined at 416 to continue to generate predicted DoA values using the trained model, the method 400 proceeds from 416 to 402, to generate replacement training data.

At 418, the method 400 uses DoA values predicted at 414 to actuate an antenna array, such as the antenna array 302 of FIG. 3, the antenna system 116 of the base station 110, or the antenna system 136 of a terminal 130.

As mentioned above, the method 400 may be performed in a distributed manner under control of the AR DoA estimation circuitry 118 of the base station 110 and under control of the AR DoA estimation circuitry 138 of a terminal 130. For example, in some embodiments, acts 402 to 408 may be performed under control of the AR DoA estimation circuitry 118 of the base station 110, and acts 410 to 418 under control of the AR DoA estimation circuitry 138 of a terminal 130. In another example, acts 402-408 and 418 may be performed under control of the AR DoA estimation circuitry 118 of the base station 110, and acts 410 to 416 under control of the AR DoA estimation circuitry 138 of a terminal 130.

Embodiments of the method 400 of FIG. 4 may not include all of the illustrated acts, may include additional acts, may combine acts, and may perform acts in various orders. For example, in some embodiments an act of generating inertial sensor data using sensors 140 of a terminal 130 may be performed, and the generated sensor data used to generate or adjust the DoA predictions at 414, or used to determine whether to continue generating DoA predictions using the trained model at 416 or to request new training data to generate a new model.

Figure 5:
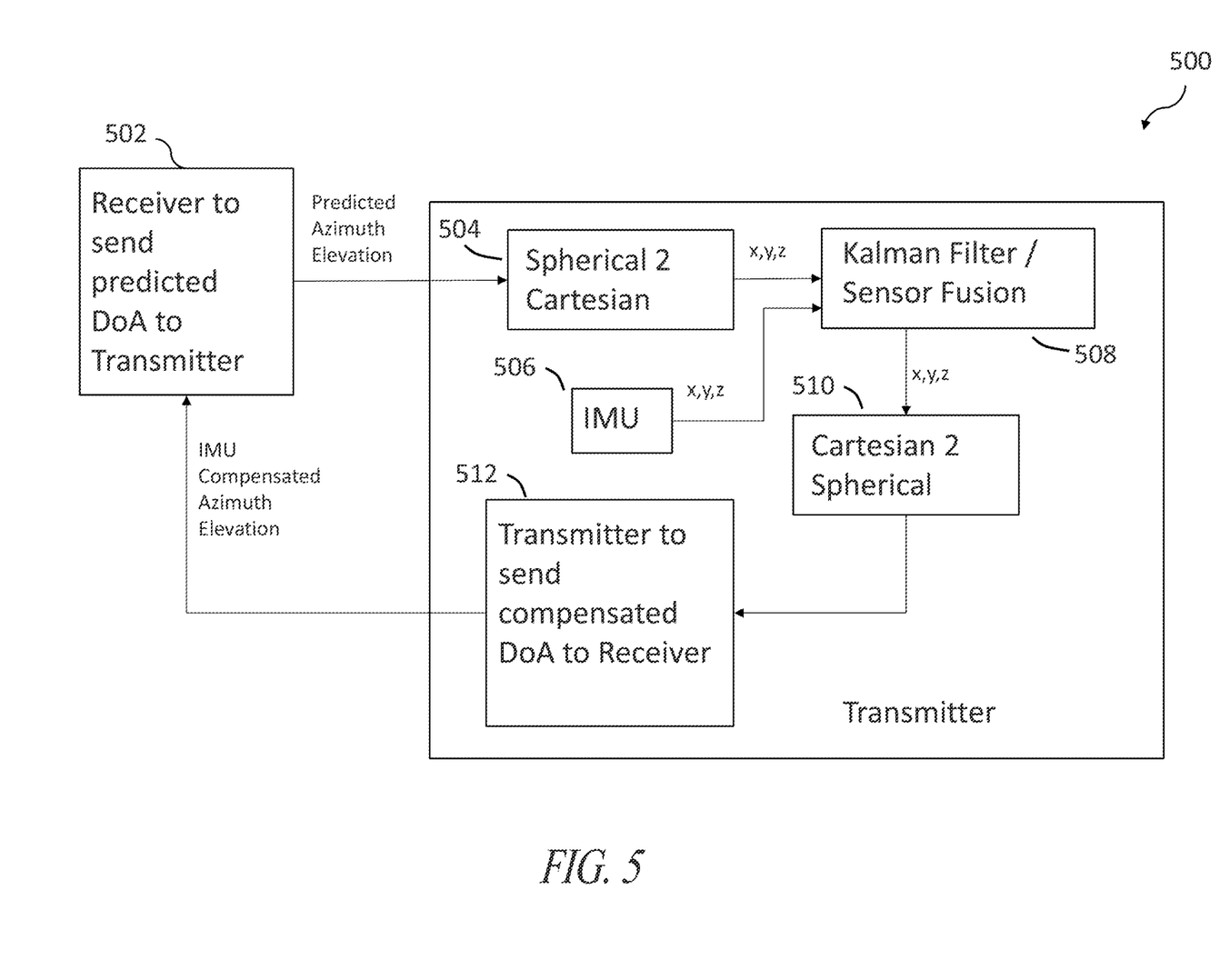
FIG. 5 illustrates an embodiment of a method of using inertial sensing data to adjust measured, estimated or predicted DoA values.

FIG. 5 illustrates an embodiment of a method 500 of using inertial sensing data to adjust measured, estimated or predicted DoA values, and will be described for convenience with reference to FIGS. 1 to 4. The method 500 may be performed, for example, under control of the base station 110 (e.g., under control of the processing core 112 or the AR DoA estimation circuitry 118), under control of the terminal device 130 (e.g., under control of the processing core 132 or the AR DoA estimation circuitry 138 of the terminal device 130) or in a distributed manner under control of both the base station 110 and the terminal device 130 of FIG. 1.

The method 500 begins at 502 and 506. At 502, a receiver sends predicted or measured DoA values to a transmitter. As illustrated, the predicted or measured DoA values may be in spherical coordinates (e.g., in azimuth and elevation angles). For example, a base station 110 may generate predicted or measured DoA values in spherical coordinates (e.g., using conventional DoA techniques or AR based DoA techniques) and transmit the DoA values to a terminal device 130. The method 500 proceeds from 502 to 504.

At 504, the method 500 converts the received DoA values from spherical coordinates to Cartesian coordinates. This may be done using conventional spherical to Cartesian conversion techniques. The method 500 proceeds from 504 to 508.

At 506, the method 500 generates data indicative of a position of the transmitter. This may be done, for example, using an inertial sensing unit or inertial sensors 140 to generate inertial sensor data in a conventional manner (e.g., generating data using inertial sensors such a gyroscopes or accelerometers). The generated sensor data indicative of the position of the transmitter may be in expressed in Cartesian coordinates (e.g., x, y, z coordinates), and may include, for example, data generated independently or jointly by gyroscopes and by accelerometers. The method 500 proceeds from 506 to 508.

At 508, the method 500 fuses DoA measurements or estimates received from the receiver with the generated sensor data indicative of the position of the transmitter, for example, using a Kalman filter (note an artificial neural network could be used instead of Kalman filter). Data fusion is the process of combining and/or integrating multiple sources of data, in order to produce more useful, accurate, and/or consistent information than that provided by any of the individual data sources. For example, a more accurate location or position estimates of the device 120 may be obtained, by combining multiple data sources such as the data from the DoA predictor and the data from the IMU. Kalman filters are common filters used for fusion, and any known implementation of Kalman filter by those skilled in the art maybe used to implement act 508. As illustrated, the fused data is provided in Cartesian coordinates. The method proceeds from 508 to 510.

At 510, the method 500 converts the fused DoA information received from 508 from Cartesian coordinates to spherical coordinates. This may be done using conventional Cartesian to spherical conversion techniques. The method 500 proceeds from 510 to 512.

At 512, the transmitter sends the adjusted or compensated DoA values to the receiver. As illustrated, the adjusted or compensated DoA values may be in spherical coordinates (e.g., in azimuth and elevation angles). For example, a terminal 130 may send adjusted or compensated DoA values in spherical coordinates to a base station 110, which may use the adjusted DoA values to actuate an antenna array (see act 418 of FIG. 4).

As mentioned above, the method 500 may be performed under control of a single device, or in a distributed manner. For example, in an embodiment the receiver and the transmitter may both be part of a terminal device, such as a terminal 130 of FIG. 1. The receiver of the terminal device 130 may generate the measured or predicted DoA values, or receive the values from a base station 110, or some combination thereof, and provide the values to the transmitter of the terminal device 130. The receiver of the terminal device 130 may use the adjusted or compensated values to actuate or control signal processing associated with an antenna array of the terminal device. In another example, the spherical to Cartesian, and inverse transform, can be implemented in the Receiver (502). In another example, the receiver may be part of a base station, such as the base station 110 of FIG. 1, and the transmitter may be part of a terminal device, such as the terminal device 130. The receiver of the base station 110 may generate the measured or predicted DoA values and provide the values to the transmitter of the terminal device 130. The receiver of the base station 110 may use the adjusted or compensated values to actuate or control signal processing associated with an antenna array of the base station 110.

Embodiments of the method 500 of FIG. 5 may not include all of the illustrated acts, may include additional acts, may combine acts, and may perform acts in various orders. For example, in some embodiments an act of determining whether the received DoA values satisfy a reliability criterion may be performed, and used to determine whether to request a new set of predicted DoA values, to determine whether to use a particular received DoA value, etc.

Figure 6:
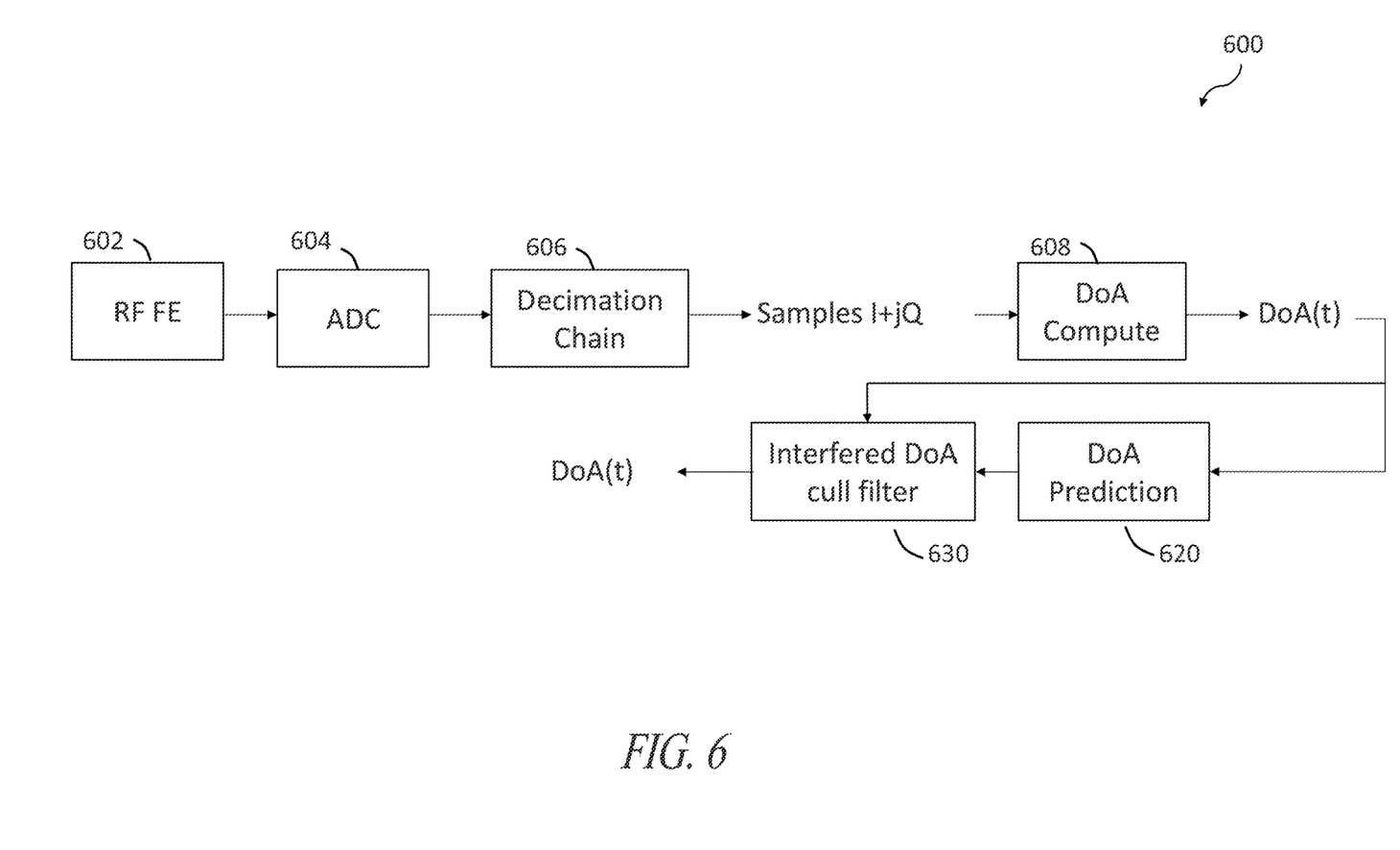
FIG. 6 illustrates an embodiment of a method of filtering a set of DoA values.

FIG. 6 illustrates an embodiment of a method 600 of using predicted AR DoA values to filter a set of measured DoA values and will be described for convenience with reference to FIGS. 1 to 5. The method 600 may be performed, for example, under control of the base station 110 (e.g., under control of the processing core 112 or the AR DoA estimation circuitry 118), under control of the terminal device 130 (e.g., under control of the processing core 132 or the AR DoA estimation circuitry 138 of the terminal device 130) or in a distributed manner under control of both the base station 110 and the terminal device 130 of FIG. 1.

The method 600 begins at 602, where a radio-frequency front end 602 converts radio frequency signals to base band signals, which may be done in a conventional manner. The method 600 proceeds from 602 to 604. At 604, the base band signals are converted to digital signals in the frequency domain, which may be done in a conventional manner using an analog to digital converter (ADC). The method 600 proceeds from 604 to 606. At 606, a decimation chain generates a complex representation of the digital signals in the time domain, e.g., a set of I and jQ (complex) samples, which may be done in a conventional manner. The method 600 proceeds from 606 to 608. At 608, the method 600 generates and stores a set of absolute DoA data values DoA(t−1), DoA(t−2) . . . , DoA(t−T) in a time interval 1, 2, . . . , T, where T is a number of samples of a training data set. This may be done, for example, using a 2D music algorithm or an ANN in a conventional manner, such as discussed above with reference to act 404 of FIG. 4. The method 600 proceeds from 608 to 620.

At 620, the method 600 performs AR DoA prediction, generating a series of predicted DoA values based on the most recent DoA value generated at 608. This may be done, for example, as discussed above with reference to acts 410 to 414 of FIG. 4. The method 600 proceeds from 620 to 630.

At 630, the method 600 selectively removes or culls samples from a sequence of DoA samples generated at 608 and provides a series of DoA values as an output. This may be done, for example, by comparing the DoA value for time t generated at act 608 to an AR DoA value for time t generated at act 620 and culling the DoA value for time t generated at 608 based on the comparison indicating the DoA value generated for time t at 608 may be erroneous. For example, if the difference between the DoA value for time t generated at 608 and the AR DoA value for time t generated at 620 exceeds a threshold value, the DoA value for time t may be culled from the set of DoA values, for example, used to actuate an antenna array (e.g., at act 418 in FIG. 4).

As mentioned above, the method 600 may be performed under control of a single device, or in a distributed manner. For example, in an embodiment the method 600 may be performed by a base station 110, to provide a filter set of DoA values to a terminal device 130. The terminal device 130 may then use the filtered set of DoA values to actuate an antenna array directly or may use the filtered set of DoA values as training data to generate a sequence of DoA values using the method 400 of FIG. 4, or various combinations thereof. In another example, a terminal station 130 may perform the method 600 of FIG. 6 as part of performing the method 400 of FIG. 4, e.g., to generate or update the training data set used at 410 to train the AR model.

Embodiments of the method 600 of FIG. 6 may not include all of the illustrated acts, may include additional acts, may combine acts, and may perform acts in various orders. For example, in some embodiments an act of fusing predicted DoA values with inertial sensor data may be performed, such as discussed above with reference to FIG. 5.

Figure 7:
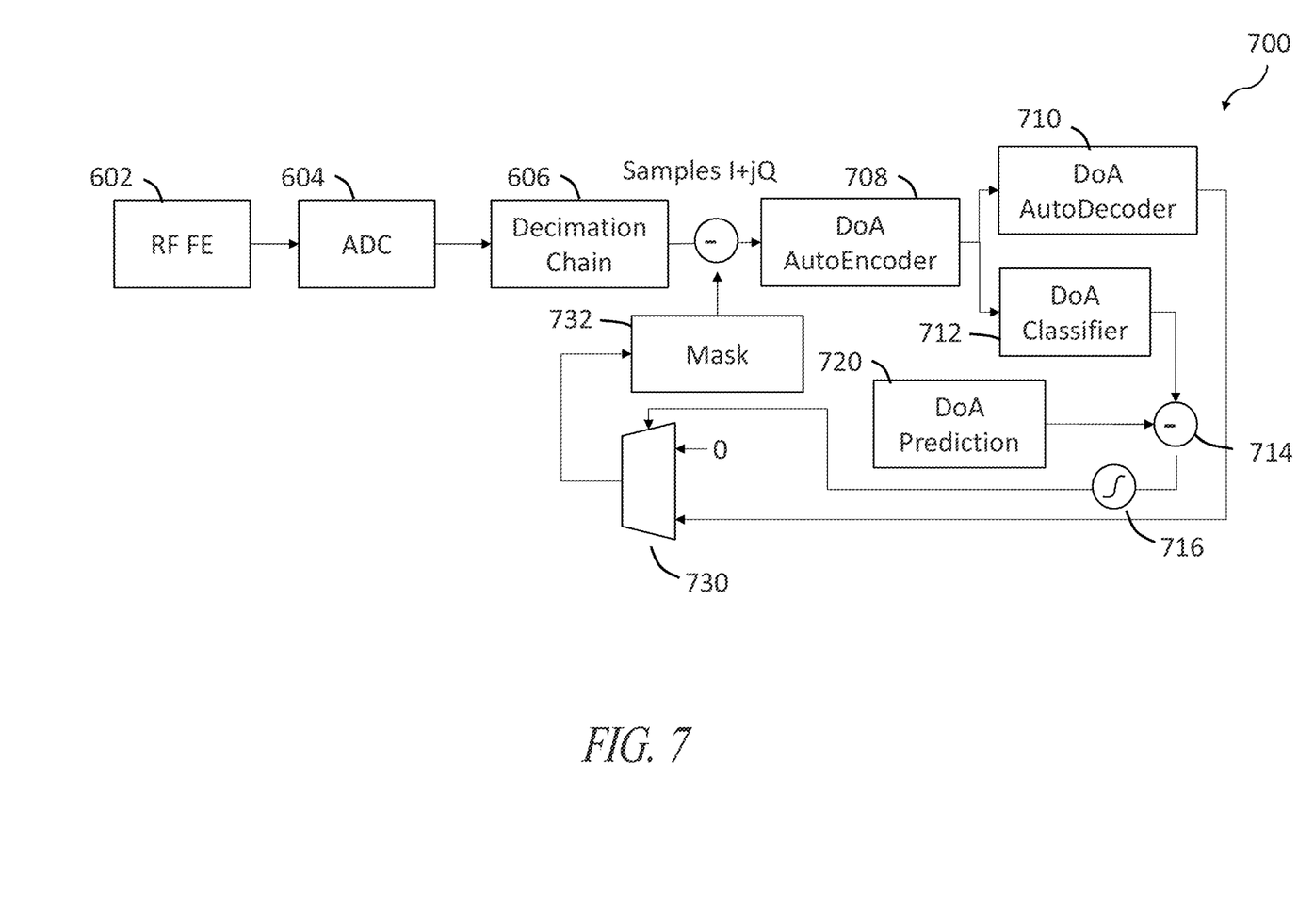
FIG. 7 illustrates an embodiment of a method of filtering input samples used to predict DoA values.

FIG. 7 illustrates an embodiment of a method 700 of using predicted AR DoA values to filter samples used to generate a set of DoA values, and is based on an ANN autoencoder framework. FIG. 7 will be described for convenience with reference to FIGS. 1 to 6. The method 700 may be performed, for example, under control of the base station 110 (e.g., under control of the processing core 112 or the AR DoA estimation circuitry 118), under control of the terminal device 130 (e.g., under control of the processing core 132 or the AR DoA estimation circuitry 138 of the terminal device 130), or in a distributed manner under control of both the base station 110 and the terminal device 130 of FIG. 1.

The method 700 begins with acts 602, 604, and 606, which are described above with reference to FIG. 6. The method proceeds from 606 to 708. At 708, the method 700 generates DoA compressed code using an autoencoder, which may be done in a conventional manner. The compact code is provided to acts 710 (for decoding) and 712 (for classification). At 710, autodecoding is performed on the compressed code to generate an approximated DoA output, which is a lossy reproduction of the input samples to the autoencoder 708. The autodecoding at 710 may be performed in a conventional manner. At 712, the code generates DoA values by classifying the compressed code generated at 708. The classifying at 712 may be performed in a conventional manner for example using the SoftMax layer function known in the state of art. See, for example, <<https://>><<en.>><<wikipedia.>><<org/>><<wiki/>>
<<Softmax_function>>.

At 720 (like in 414), the method 700 performs AR DoA prediction, generating a series of predicted DoA values based on the most recent DoA values. This may be done, for example, as discussed above with reference to acts 410 to 414 of FIG. 4. The method 700 proceeds from 720 to 714.

At 714, the method 700 compares predicted DoA values generated at 720 with classified DoA values generated at 712, generating a classification of a sample received at 708 as, for example, belonging to a certain (azimuth, elevation) bin. The method proceeds from 714 to 716, where the difference between DoA prediction 720 and classification of samples 712 is passed to a non linear function (such as sigmoid or hyperbolic known in literature, see, e.g., <<https://>><<en.>><<wikipedia.>><<org/>><<wiki/>><<Sigmoid_function>> and
<<https://>><<en.>><<wikipedia.>><<org/>><<wiki/>><<Hyperbolic_functions>>) to generate a control signal. For example, if the difference is too high, the resulting non linear passed signal will indicate the samples should be removed from the data stream, otherwise it will indicate the samples do not need to be removed from the data stream.

The method 700 proceeds from 716 to 730, where it is determined based on the control signal whether to provide a zero or the reconstructed input sample generated at 710 to a masking block at 732. For example, when the control signal indicates the samples are to be used, the method 700 provides a zero to the mask at 732. Conversely, when the control signal indicates the samples are not to be used, the method 700 provides a reconstructed signal generated at 710 to the mask. At 732, the mask is combined with the samples generated at 606 to provide the input to the DoA autoencoding at 708. For example, when the mask is a zero, the input samples generated at 606 are not modified by the mask, and if the mask is a reconstructed sample, the reconstructed sample is subtracted from the samples generated at 606, for example because these are too noisy and should not be used for any further processing.

As mentioned above, the method 700 may be performed under control of a single device, or in a distributed manner. For example, in an embodiment the method 700 may be performed by a base station 110, to provide a filter set of DoA values provided to a terminal device 130. The terminal device 130 may then use the filtered set of DoA values to actuate an antenna array directly or may use the filtered set of DoA values as training data to generate a set of DoA value using the method 400 of FIG. 4, or various combinations thereof. In another example, a terminal station 130 may perform the method 700 of FIG. 7 as part of performing the method 400 of FIG. 4, e.g., to generate or update the training data set used at 410 to train the AR model.

Embodiments of the method 700 of FIG. 7 may not include all of the illustrated acts, may include additional acts, may combine acts, and may perform acts in various orders. For example, in some embodiments an act of fusing predicted DoA values with inertial sensor data may be performed, such as discussed above with reference to FIG. 5.

FIGS. 4, 5, 6, and 7 are diagrams illustrating processes or functions that may be used in embodiments presented herein. In this regard, each described process may represent a module, segment, or portion of code, which comprises one or more executable instructions for implementing the specified logical function(s). It should also be noted that in some implementations, except where an order is expressly stated, the functions noted in the process may occur in a different order, may include additional functions, may occur concurrently, and/or may be omitted.

In an embodiment, a device includes a memory and processing circuitry coupled to the memory. The processing circuitry, in operation, generates an indication of a predicted difference in a direction of arrival (DoA) of a signal using a trained autoregressive model. A predicted indication of a DoA of the signal is generated based on a previous indication of the DoA of the signal and the indication of the predicted difference in the DoA of the signal. The processing circuitry actuates or controls an antenna array based on predicted indications of the DoA of the signal. In an embodiment, the processing circuitry, in operation, generates the trained autoregressive model using a set of differentiated DoA values. In an embodiment, the processing circuitry, in operation, generates the set of differentiated DoA values. In an embodiment, the processing circuitry, in operation: computes a set DoA values; and generates the set of differentiated DoA values based on the computed set of DoA values. In an embodiment, the processing circuitry, in operation, computes the set of DoA values using a 2D MUSIC algorithm. The device of claim 4, wherein the processing circuitry, in operation, computes the set of DoA values using an artificial neural network. In an embodiment, the artificial neural network, in operation, is an autoencoder neural network. In an embodiment, the processing circuitry, in operation receives a set of DoA values; and generates the set of differentiated DoA values based on the received set of DoA values. In an embodiment, the processing circuitry, in operation, iteratively: generates indications of predicted differences in the direction of arrival (DoA) of the signal using the trained autoregressive model; and generates predicted indications of the DoA of the signal. In an embodiment, the processing circuitry, in operation: selectively initiates updating of the trained autoregressive model. In an embodiment, the selectively initiation is performed periodically. In an embodiment, the processing circuitry, in operation: fuses the predicted indication of the DoA of the signal with inertial sensor data indicative of the DoA of the signal, generating a fused indication of the DoA of the signal; and actuates the antenna array based on fused indication of the DoA of the signal. In an embodiment, the processing circuitry comprises: a spherical to Cartesian converter; a Kalman filter; and a Cartesian to spherical converter. In an embodiment, the processing circuitry, in operation culls a received set of DoA values; and generates the set of differentiated DoA values based on the culled set of DoA values. In an embodiment, the processing circuitry, in operation: implements an artificial neural network, which, in operation, generates DoA classifications; and applies a mask to the received set of DoA values based on a comparison of DoA classifications and generated predicted indications of the DoA. In an embodiment, the processing circuitry, in operation, actuates the antenna array based on computed DoA values and actuates the antenna array based on the predicted indications of the DoA.

In an embodiment, a system comprises an antenna array and processing circuitry coupled to the antenna array. The antenna array, in operation, transmits and receives signals. The processing circuitry, in operation generates predicted differences in a direction of arrival (DoA) of a signal using a trained autoregressive model; generates predicted DoAs of the signal based on the predicted differences; and controls operation of the antenna array based on predicted DoAs. In an embodiment, the processing circuitry, in operation, generates the trained autoregressive model using a set of differentiated DoA values. In an embodiment, the processing circuitry, in operation, generates the set of differentiated DoA values. In an embodiment, the processing circuitry, in operation: computes a set DoA values; and generates the set of differentiated DoA values based on the computed set of DoA values. In an embodiment, the processing circuitry, in operation: fuses predicted DoAs of the signal with inertial sensor data indicative of DoAs of the signal, generating fused predicted DoAs of the signal; and controls operation of the antenna array based on fused predicted DoAs of the signal. In an embodiment, the processing circuitry, in operation: culls a received set of DoA values; and generates the set of differentiated DoA values based on the culled set of DoA values.

In an embodiment, a method comprises generating predicted differences in a direction of arrival (DoA) of a signal using a trained autoregressive model. Predicted DoAs of the signal are generated based on the predicted differences. Operation of an antenna array is controlled based on the predicted DoAs. In an embodiment, the method comprises generating the trained autoregressive model using a set of differentiated DoA values. In an embodiment, the method comprises generating the set of differentiated DoA values.

In an embodiment, a non-transitory computer-readable medium has contents which configure a processing system to perform a method. The method comprises: generating predicted differences in a direction of arrival (DoA) of a signal using a trained autoregressive model; generating predicted DoAs of the signal based on the predicted differences; and controlling operation of an antenna array based on predicted DoAs. In an embodiment, the method comprises generating the trained autoregressive model using a set of differentiated DoA values. In an embodiment, the contents comprise instructions executable by the processing system.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a memory; and
processing circuitry coupled to the memory, wherein the processing circuitry, in operation:
generates an indication of a predicted difference in a direction of arrival (DoA) of a signal using a trained autoregressive model;
generates a predicted indication of a DoA of the signal based on a previous indication of the DoA of the signal and the indication of the predicted difference in the DoA of the signal; and
actuates an antenna array based on predicted indications of the DoA of the signal.

2. The device of claim 1, wherein the processing circuitry, in operation, generates the trained autoregressive model using a set of differentiated DoA values.

3. The device of claim 2, wherein the processing circuitry, in operation, generates the set of differentiated DoA values.

4. The device of claim 3, wherein the processing circuitry, in operation:
computes a set DoA values; and
generates the set of differentiated DoA values based on the computed set of DoA values.

5. The device of claim 4, wherein the processing circuitry, in operation, computes the set of DoA values using a 2D MUSIC algorithm.

6. The device of claim 4, wherein the processing circuitry, in operation, computes the set of DoA values using an artificial neural network.

7. The device of claim 6, wherein the artificial neural network, in operation, is an autoencoder neural network.

8. The device of claim 3, wherein the processing circuitry, in operation:
receives a set of DoA values; and
generates the set of differentiated DoA values based on the received set of DoA values.

9. The device of claim 1, wherein the processing circuitry, in operation, iteratively:
generates indications of predicted differences in the direction of arrival (DoA) of the signal using the trained autoregressive model; and
generates predicted indications of the DoA of the signal.

10. The device of claim 9, wherein the processing circuitry, in operation:
selectively initiates updating of the trained autoregressive model.

11. The device of claim 10, wherein the selectively initiation is performed periodically.

12. The device of claim 1, wherein the processing circuitry, in operation:
fuses the predicted indication of the DoA of the signal with inertial sensor data indicative of the DoA of the signal, generating a fused indication of the DoA of the signal; and
actuates the antenna array based on fused indication of the DoA of the signal.

13. The device of claim 12, wherein the processing circuitry comprises:
a spherical to Cartesian converter;
a Kalman filter; and
a Cartesian to spherical converter.

14. The device of claim 3, wherein the processing circuitry, in operation:
culls a received set of DoA values; and
generates the set of differentiated DoA values based on the culled set of DoA values.

15. The device of claim 14, wherein the processing circuitry, in operation:
implements an artificial neural network, which, in operation, generates DoA classifications; and
applies a mask to the received set of DoA values based on a comparison of DoA classifications and generated predicted indications of the DoA.

16. The device of claim 1, wherein the processing circuitry, in operation, actuates the antenna array based on computed DoA values and actuates the antenna array based on the predicted indications of the DoA.

17. A system, comprising:
an antenna array, which, in operation, transmits and receives signals; and
processing circuitry coupled to the antenna array, wherein the processing circuitry, in operation:
generates predicted differences in a direction of arrival (DoA) of a signal using a trained autoregressive model;
generates predicted DoAs of the signal based on the predicted differences; and
controls operation of the antenna array based on predicted DoAs.

18. The system of claim 17, wherein the processing circuitry, in operation, generates the trained autoregressive model using a set of differentiated DoA values.

19. The system of claim 18, wherein the processing circuitry, in operation, generates the set of differentiated DoA values.

20. The system of claim 19, wherein the processing circuitry, in operation:
- computes a set DoA values; and
- generates the set of differentiated DoA values based on the computed set of DoA values.

21. The system of claim 17, wherein the processing circuitry, in operation:
- fuses predicted DoAs of the signal with inertial sensor data indicative of DoAs of the signal, generating fused predicted DoAs of the signal; and
- controls operation of the antenna array based on fused predicted DoAs of the signal.

22. The system of claim 19, wherein the processing circuitry, in operation:
- culls a received set of DoA values; and
- generates the set of differentiated DoA values based on the culled set of DoA values.

23. A method, comprising:
- generating predicted differences in a direction of arrival (DoA) of a signal using a trained autoregressive model;
- generating predicted DoAs of the signal based on the predicted differences; and
- controlling operation of an antenna array based on predicted DoAs.

24. The method of claim 23, comprising:
- generating the trained autoregressive model using a set of differentiated DoA values.

25. The method of claim 24, comprising:
- generating the set of differentiated DoA values.

26. A non-transitory computer-readable medium having contents which configure a processing system to perform a method, the method comprising:
- generating predicted differences in a direction of arrival (DoA) of a signal using a trained autoregressive model;
- generating predicted DoAs of the signal based on the predicted differences; and
- controlling operation of an antenna array based on predicted DoAs.

27. The non-transitory computer-readable medium of claim 26, wherein the method comprises:
- generating the trained autoregressive model using a set of differentiated DoA values.

28. The non-transitory computer-readable medium of claim 26, wherein the contents comprise instructions executable by the processing system.

* * * * *